F. S. INGOLDSBY.
AUTOMOBILE TIRE.
APPLICATION FILED AUG. 12, 1912.

1,149,833.

Patented Aug. 10, 1915.
2 SHEETS—SHEET 1.

WITNESSES:
Gertrude L. Smith
Justin W. Macklin

INVENTOR
Frank S. Ingoldsby,
BY Albert H. Baker, ATTY.

F. S. INGOLDSBY.
AUTOMOBILE TIRE.
APPLICATION FILED AUG. 12, 1912.
1,149,833.
Patented Aug. 10, 1915.
2 SHEETS—SHEET 2.
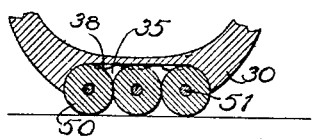
FIG. 7.
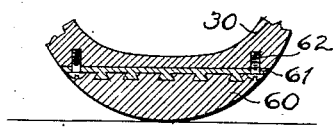
FIG. 8.
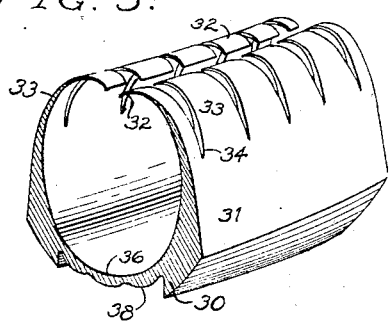
FIG. 5.
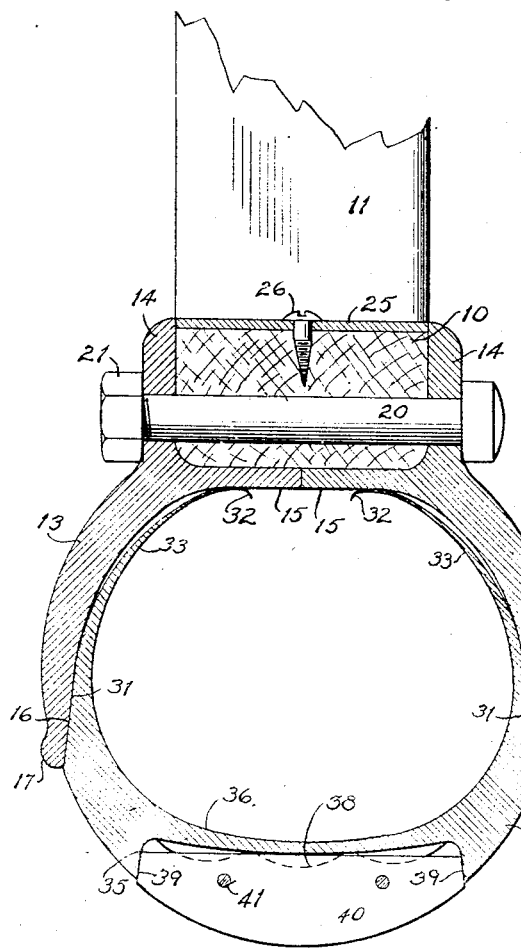
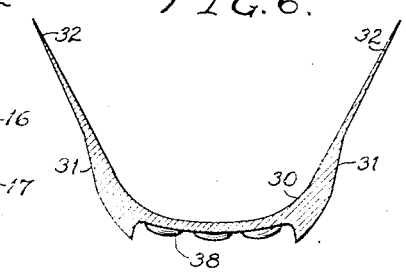
FIG. 6.
FIG. 4.
WITNESSES:
Gertrude K. Smith
Justin W. Macklin
INVENTOR:
Frank S. Ingoldsby,
BY Albert H. Bate,
ATTY.

UNITED STATES PATENT OFFICE.

FRANK S. INGOLDSBY, OF PINE LAKE, MICHIGAN.

AUTOMOBILE-TIRE.

1,149,833.     Specification of Letters Patent.     Patented Aug. 10, 1915.

Application filed August 12, 1912. Serial No. 714,552.

*To all whom it may concern:*

Be it known that I, FRANK S. INGOLDSBY, a citizen of the United States, residing at Pine Lake, in the county of Oakland and State of Michigan, have invented a certain new and useful Improvement in Automobile Tires, of which the following is a full, clear, and exact description, reference being had to the accompanying drawings.

The primary object of this invention is to provide an automobile tire which shall be resilient, non-puncturable and durable in use, as well as cheap in construction.

A further object is to improve the traction and reduce the tendency to skid.

To obtain the desired resiliency, I use the combination of two well known forces—friction and spring action—so combined that one member provides both of them in a most simple and effective manner and is of such shape and size that it will be easy to make in any rolling mill. This member works within a trough-shaped rim consisting of two retaining members, which are also simple rolling mill products, so that the whole tire can be made of metal in the very easiest and cheapest way. To state it differently, I provide at the periphery of the wheel a trough-shaped rim with slightly flaring sides, and I mount in this rim an annular metal tire-member of approximately horse shoe shape in cross section, said member having its sides or wings projecting inwardly to engage the flaring rim sides frictionally and formed into springs to act against the bottom of the rim trough. Accordingly, the tendency of the tread of the tire to move inwardly in action is resisted by the friction of the side walls of the tire member, as well as by the spring action of the inner ends of those walls. This gives the desired elasticity and resiliency of the tire, while at the same time it is non-puncturable and extremely durable. The intermediate metal portion of the tire member may itself constitute the tread, or additional treads may be mounted thereon, as desired. My invention includes means for holding such separate treads and preventing their slipping on the tire member.

The invention is hereinafter more fully explained and its essential characteristics set out in the claims.

Figure 1:
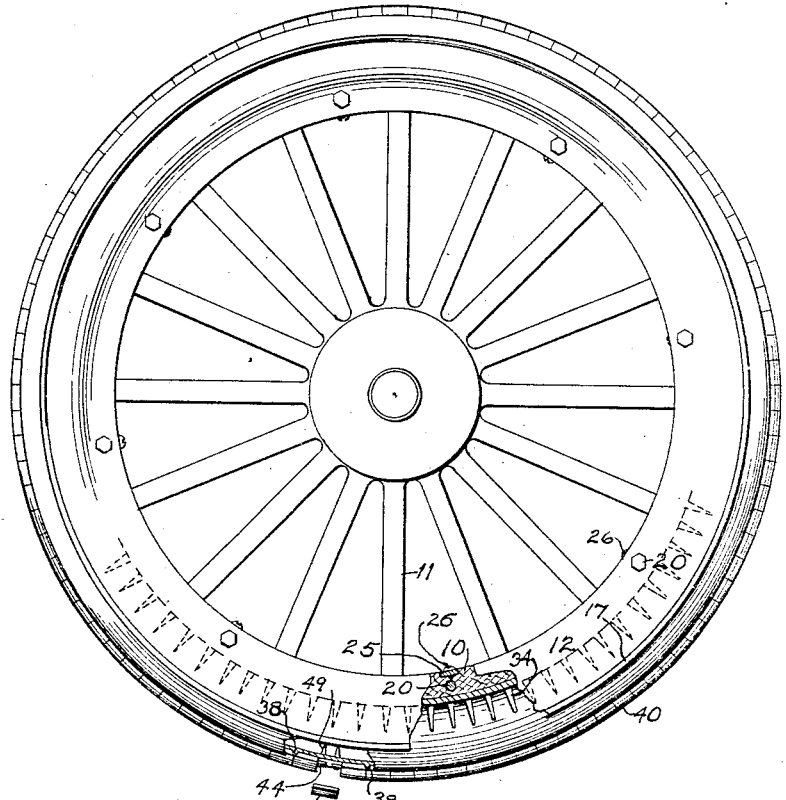
Figure 2:
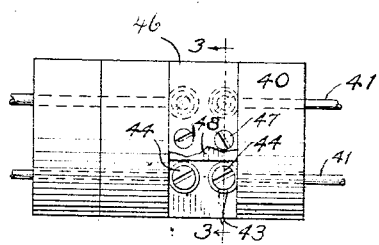
Figure 3:
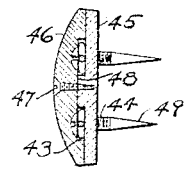

In the drawings, Figure 1 is a side elevation partly sectional of my tire showing one form of special tread; Fig. 2 is a face view of a portion of such tire illustrating such special tread, the last-placed member of the tread being partly broken away to disclose the fastening means; Fig. 3 is a side elevation of such last placed member of the tread; Fig. 4 is an enlarged cross section through the tire; Fig. 5 is a perspective of a portion of the tire member removed, with its wings of the form they have when in place; Fig. 6 is a cross section through such tire member as it comes from the rolls and before the side walls are curved inwardly; Figs. 7 and 8 are details illustrating modified forms of tread members, being cross sections through the tire member and tread.

As shown in Figs. 1 and 4, 10 represents the wooden felly of a wheel and 11 the spokes. 12 and 13 are two stationary members of my tire which are rigidly secured to the felly 10 and constitute the outwardly flaring trough-shaped rim. These two members are preferably just alike, except as to being right and left. These members have radial projecting flange portions or rings 14 adapted to rest on the sides of the felly, and the transversely projecting ring portions 15 adapted to rest on the outer face of the felly. From the junction of these portions the main wall of the member extends outwardly, preferably in the curved form shown. On the inner face of this wall is an inclined surface, as illustrated at 16. Near the outer edge of the outer face is preferably provided a bead, illustrated at 17, to prevent indenture due to rough service.

The rim members 12 and 13 may be each a continuous ring or may be made in sections, and they may conveniently be made from rolled forms. They are suitably secured to the felly, as for example, by the bolts 20 and nuts 21 passing through the flanges 14 and the felly. I provide lateral inwardly projecting flanges 15 on the two rim members which rest on the outer face of the felly, after the manner of an ordinary iron tire. On the inner face of the felly I provide abutment pieces 25 lying between the inner edges of the two flanges 14. There may be several of these abutment pieces placed between the spokes and held to the felly by screws 26; as shown in the lower part of Fig. 1. The abutment member with the lateral flanges 14 insure the two-part rim being held in true form on the felly, and in proper manner to resist its being spread apart by the wedge-like action of the tire.

As hereinafter explained, the abutment member or members perform important functions in forming a strut between the inner edges of the rim members when the outer edges are forced apart, either by the wedging or the spring action of the tire member. Furthermore, this spring action of the tire member gives the rim members a constant tendency to spread their outer edges, which keeps the bolts 20 under constant spring tension, wherefore, the structure acts after the manner of a nut lock on the nuts 21.

30 indicates what I call the tire-member, consisting of an annular tempered metal inwardly-facing trough of approximately horse shoe shape in cross section, having the inner portion of its sides or wings thinned to act as leaf springs against the trough rim. This tire member 30 has a comparatively thin middle portion 36 to give it an outward or lateral spring action, and it is thickened at the sides of such middle portion and then has flattened inwardly inclined faces 31 which have a frictional sliding engagement with the inclined surfaces 16, bearing against them by reason of being bent inwardly when originally seated. Beyond this flattened portion the wing continues curving inwardly and constantly narrowing, and at its free end is curved inwardly on a short radius, as shown at 32. The spring portions 33 have notches in them, as shown at 34 in Figs. 1 and 5, whereby a series of spring fingers are provided effectively engaging the trough-shaped rim and giving a radial spring action.

The tire member 30 may be conveniently made by rolling a hot billet of proper metal (vanadium steel, for example) into a flaring trough shape, a cross section of which is shown in Fig. 6. The notches 34 are made in it at the time of rolling, or thereafter. The shaped bar now passes, while still hot, to side rolls which bend its edges up over a properly shaped core, the stem of which has easy passage between the adjacent ends 32 and thus is made the true tubular form shown in Figs. 4 and 5. Then the strip is cut off the right length (as by a circular saw) and passes immediately to a bending machine, where it is given the circular form necessary to fit in the trough rim. This bending is made easy and practicable because of the notches 34 which do away with any need for distortion of the metal, except on the tread portion thereof, where it is thickest and will naturally retain its heat longest. After being formed into circular shape, an electric weld of the ends completes the shaping. After this it is tempered to give the desired spring action and it is ready for use.

The intermediate portion of the tire member 30 may itself constitute the tread. For many uses, however, it is desirable to have a supplemental tread, and to this end I have devised means for securing on the intermediate portion of the tire member suitable treads corresponding to the conditions required. These treads may consist of blocks of wood (creosoted, if desired); compacted hemp fiber, vulcanized rubber, or various kinds of composition or materials, as desired.

In Figs. 1 to 4 I have illustrated treads consisting of wooden blocks 40 strung onto wires 41 and occupying a recess 35 in the face of the tire member. These blocks 40 are fashioned with radial sides to fit snugly against each other, and the wires on which they are strung may have eyes 43 at their ends adapted to receive holding screws 44 passing into the tire member. To effect this, the wires are of such length that when stretched about the tire member a space is left between the endmost blocks of substantially the cross section of a block. In this space a partial block 45 is provided having holes for the passage of the screws 44. After the screws are put in place, thus fastening the string of blocks, a supplemental partial block or cap 46 is driven into place over the screws 44 and fastened by screws 47. The block 46 has recesses for the reception of the eyes 43 and heads of the screws 44, while the block 45 preferably has a central enlargement 48 to give a more secure fastening for the screws 47 and also to help hold the block 46 in true position.

It will be noted that the side walls 39 of the recess 35 in the tire member are slightly flaring or inclined, so that the tread blocks which are correspondingly formed at their ends act as wedges in their seats. This enables them to be held very firmly to the tire member. By having the string of blocks an incomplete annulus, it is easy to put it in place. It is simply slipped over the periphery of the tire member into the recess. Then the blocks are driven into place in their tapered seat. The periodic projections 38, hereinafter referred to, on the tire member form gages to properly position the string of blocks so that, in securing the tread, the driving in of the blocks may be started at any convenient point, either at one end or intermediately, the tread being positioned every few blocks by means of the projections. In this way the wires 41 are stretched about the tire member as the blocks are driven home. To give a final stretch to the end portions of the wire when the eyes are being secured, I prefer to taper the screws 44 inward, beyond their threads, as shown at 49, so that, when the eyes are placed overlapping the holes for the screws, the screw may be forced home and its taper will act as a cam on the eye, drawing the adjacent parts of the wires into a snug fit, after which the turning in of the screws will make everything secure. Now, the cap 46 is driven into place and secured by its screws 47. This cap block, it should be noted, is held in position not only by its screws 47, but by its driving fit with the adjacent blocks and by the end walls of the recess in the tire member which engage the ends of the block, and displacement is furthermore prevented by the inside shoulders. This tire of individual blocks may be extremely cheap, for the blocks are all of one pattern and can be obtained from small pieces or scrap, and the process of making the blocks and straining them on the wires can be effected by machinery. The wooden fiber retains grit from the road which makes minute projections, retarding skidding and improving the tractive hold. If desired these blocks may be soaked in a preserving liquid, or a light coating of tar put in the groove of the tire member just before applying the blocks may be used as a preservative and as an additional adhesive. The wires 41 are preferably galvanized to protect them from rust.

To prevent slippage of the tread described about the metal tire member, I form at intervals on the latter member projection 38 which are adapted to enter between adjacent blocks of the tread. These projections are tapered practiclly to the edge or are V-shaped, and the inner edges of the corresponding blocks are chamfered to provide space for them. This not only holds the blocks against travel on the tire member, but provides an exact gage, making it easy to secure a perfect fit of the tread. As shown in Figs. 4 and 5, there are three of these projections 38 side by side, though other arrangement of them may be made, if desired. I prefer to have a number of separate projections in a transverse row, as shown, instead of one continuous cross rib, because the separate projections do not materially reduce the spring action of the tire member at such places.

Fig. 7 shows a modified form of tread carried by the tire member 30. In this view, 50 illustrates three solid rubber rings, which seat in the recess 35 and are held by wires 51, the ends of which may conveniently be electrically welded together. With this form of tread, the sides of the recess are preferably rounded to provide a better seat for the outer rubber rings. The projections 38, which prevent the slipping, are preferably rounded on their edges so that they will not cut into the rubber. These rings are made as large or small as the service demands and, in the event of damage, only the damaged ring need be replaced. The spaces within the recess between the rings provide a natural place for the reception of the rubber when the ring is distorted by compression, and this adds to the resiliency of the tread, as well as reducing the wear on the rubber. By having the plurality of points of contact with the road, better traction and durability is obtained, as well as less liability to skid.

Fig. 8 shows another form of tread in which a solid rubber portion 60 is vulcanized to a dove-tailed plate 61, which plate is fastened by screws 62 to the tire member 30. These screws are located in places where the metal of the tire member is thickest and can best stand boring of the holes for the screws.

Whatever form of tread is used, the real resilience of the tire comes from the frictional sliding and spring action of the trough-like tire member, which gives a resilience comparable to that of a pneumatic tire. A force tending to push the tire member inward is resisted by the friction of the inclined surfaces of the tire member and rim, while the spring action of the thin inner walls of the tire member opposes an increasing but resilient resistance to such force. Accordingly, the inward movement or compression of the tire is well distributed and comparatively gentle, the friction adding to the ease of absorption and distribution of shocks and making it easy for the tire member to recover its original position after an obstruction has been passed.

It will be noted that the middle portion 36 of the tire member is somewhat arch-shaped and thus the pressure of the road on the tread transmitted to the crown of the arch tends to flatten it, thus providing a mechanical action, acting in the same direction as the spring action, to keep the friction surfaces in contact at each succeeding point as it comes in contact with the road. The lateral spring action at all points around the tire keeps the tire member snugly seated, preventing rattling and taking up the wear of the friction planes.

The extreme edges 32 of the tire-member being bent on a small radius, as shown, will give sure and easy action to the springs and prevent shouldering of the metal against which they bear. At the frictional surfaces the metal is made extra thick to allow for a great amount of wear, thus insuring a long life of the tire. To minimize the wear on these friction surfaces, and also to prevent creaking or other sound from being made by the wearing surfaces, I may put inside of the tire a quantity of some cheap lubricant, which will last for an indefinite period, as it has practically no way of escaping. The natural tendency of the tire member 30 being to spring its sides outwardly, the frictional surfaces are kept in contact. The thin spring fingers of this member are very pliant and sensitive and yet are in no danger of breakage, because the strain comes on them gradually, due to the rolling of the wheel and the resulting gradual friction of the surfaces which first takes any shock and distributes it; because there are so many of them to act for any given blow that the strain each one receives is very small, and because they are entirely covered and protected. The rolling of the wheel also makes it easy for the depressed part of the tire member to recover its original position after an obstruction has been passed.

It will be noted that there is a possibility of circumferential slipping between the trough-shaped rim and the tire member. This slippage is of great advantage for automobiles using gasolene, or other motors which can not start slowly, as it will allow a more gradual application of traction. The trough-shaped rim simply slides a little on the tire member before taking hold of the latter and moving the vehicle. This slippage is also valuable in braking, diminishing the wear on the treads without material diminution of the braking action.

It will be seen from the foregoing description that my tire is non-puncturable and extremely durable and cheap; that it may be put in place with a minimum of labor and time, and that it will improve traction in two ways, namely, by the slight allowable slipping of the rim on the tire and by allowing the use of wooden or other grit-retaining treads, or other form of improved-traction, non-skidding tread member. Furthermore, ease and cheapness of manufacture are inherent characteristics of this tire.

Having thus described my invention, what I claim is:

1. The combination of a trough-shaped rim having flaring sides, a continuous metal tire member seating in the rim and substantially horse shoe shaped in cross section, the walls of said tire member converging to engage the flaring sides and decreasing in thickness toward their inner edges where they curve inwardly and are tempered to make them resilient, and are notched to provide a series of spring fingers acting to hold the tread portion of the tire member concentrically with respect to the rim.

2. The combination of a trough-shaped rim, the side walls of which have on their inner faces flaring frusto-conical surfaces, a metallic tire member of general horse shoe shape in cross section seating in said rim and having coöperating frusto-conical surfaces, the walls of such tire member toward the center from the said surfaces curving inwardly and being made thinner and tempered, forming springs bearing against the bottom of the rim.

3. The combination of a rim made of two separate side parts connected to form a single trough having outwardly inclined sides, a continuous tire member made of metal and being of approximately horse shoe shape in cross section with the wings converging into the rim and rubbing against the flaring sides and made thinner than the portion adjacent the tread and tempered to act as springs against the middle portion of the base of the trough.

4. The combination, with a trough-shaped rim having outwardly inclined sides, of a tire member made of spring metal, and having inwardly inclined sides bearing against the rim with friction and spring action, said tire member being reduced in thickness along its tread forming a thin portion to increase the spring action thereof.

5. The combination of a trough-shaped rim, an annular inwardly facing trough-shaped tire member of spring metal and bearing against the sides of the rim, said tire member having a peripheral recess on its outer face forming a thin resilient portion.

6. The combination, of an annular trough-shaped rim having flaring sides, a metallic tire member having an arched intermediate portion and side portions inwardly inclined and bearing against the sides of the rim, said tire member being made of spring metal, a groove forming a thin spring portion at the crown of the arch, and a supplemental tread on the outer periphery in said groove of the tire member bearing against the crown of the arch thereof and normally out of contact therewith on opposite sides of such crown.

7. The combination, with a trough-shaped rim having outwardly inclined sides, of a reversely facing trough-shaped tire member made of spring metal and having inwardly inclined sides bearing against the inclined sides of the rim with friction and spring action, the tread portion of the tire having an annular recess forming a thinner portion causing an outward pressure on the sides when pressure is applied to the tread, a separate tread occupying said recess, the side walls of said tire member being brought toward each other and made thinner within the rim and tempered to form springs pressing against the bottom of the same.

In testimony whereof, I hereunto affix my signature in the presence of two witnesses.

FRANK S. INGOLDSBY.

Witnesses:
  ALBERT H. BAKES,
  BRENNAN B. WEST.